Aug. 27, 1929.  O. E. ANDERSON  1,725,743
PULVERIZER AND MIXER
Filed March 11, 1927
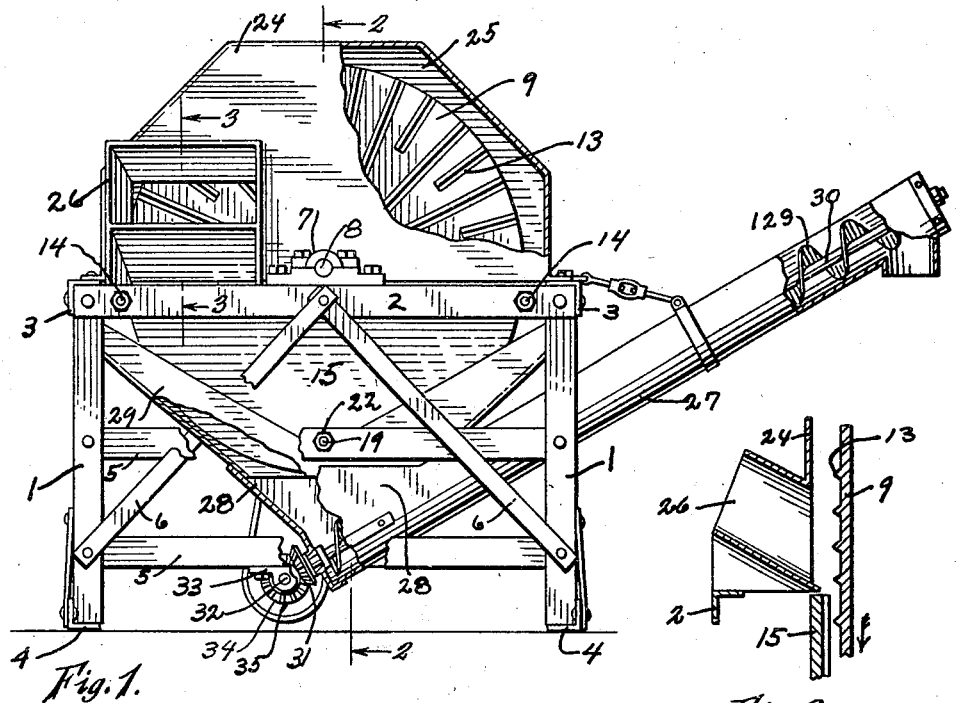
Fig. 1.
Fig. 3.
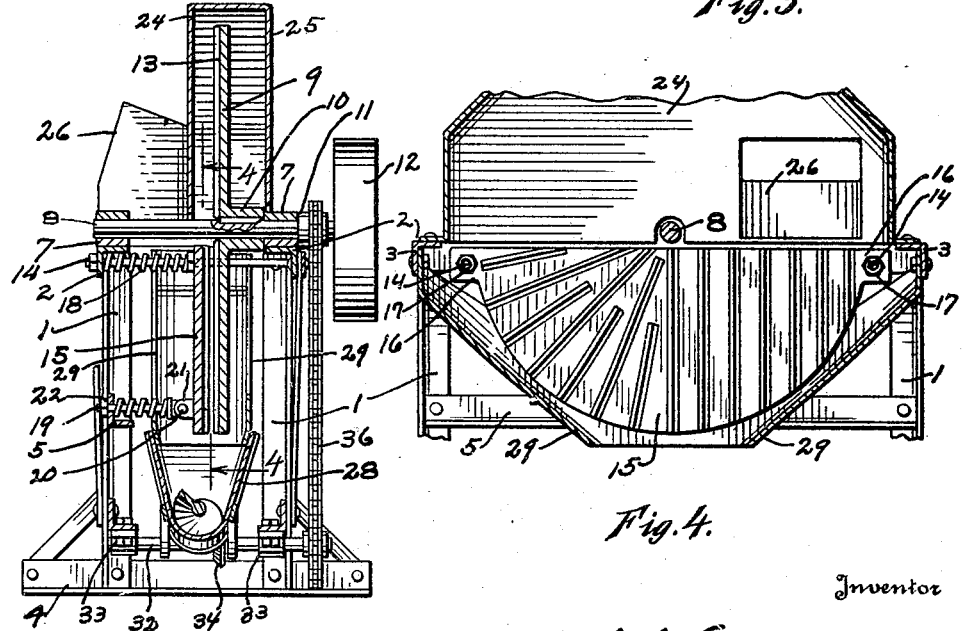
Fig. 2.
Fig. 4.
Inventor
Olof E. Anderson Patented Aug. 27, 1929.

1,725,743

UNITED STATES PATENT OFFICE.

OLAF E. ANDERSON, OF DENVER, COLORADO.

PULVERIZER AND MIXER.

Application filed March 11, 1927. Serial No. 174,481.

This invention relates to improvements in machines for pulverizing soil and mixing it with fertilizer and manure.

Florists, gardeners and others who require a fine rich soil for raising flowers or other plants have been in the habit of mixing soil, leaf mould, manure and fertilizer so as to form a fine rich soil that can be used in pots and in beds more especially for the raising of hot house flowers, plants and vegetables. This mixing has usually been done by hand, the ingredients being handled by shovels. This has been a tedious and laborious process and therefore expensive.
In order to facilitate this mixing operation, various kinds of machines have been invented and used with more or less success.

It is the object of this invention to produce a machine that will thoroughly pulverize and mix soil and manure or leaf mould at a high rate and thereby reduce the cost of this operation and at the same time produce an excellent mixture.

My invention, briefly described, comprises a framework on which is rotatably mounted a circular grinding wheel, one side of which is provided with a large number of radial ribs. Supported by the framework in parallel relation to the grinding wheel and adjacent the ribbed surface thereof is a stationary plate which, like the grinding wheel is also provided with a large number of ribs on the face adjacent the grinding wheel. The stationary plate is substantially semi-circular and is located beneath the axis of rotation of the grinding wheel. Resilient means is provided for normally holding the stationary disk at a predetermined distance from the face of the rotating wheel but which permits the plate to be moved away from the rotating grinding wheel so as to prevent breakage in case stones or other hard objects should be accidentally fed to the machine. Located underneath the grinding wheel is a conveyor into which the ground mixture is received and which serves to more thoroughly mixed the ingredients and to convey the mixture away from the machine.

Having thus briefly described the machine, I will now proceed to describe it in detail, and reference for this purpose will now be had to the accompanying drawing in which the preferred embodiment thereof has been illustrated and in which:
Fig. 1 is a front side elevation of my improved machine, portions thereof being broken away to more clearly disclose the construction.

Fig. 2 is a vertical transverse section taken on line 2—2, Fig. 1.
Fig. 3 is section through the feeding hopper, taken on line 3—3, Fig. 1 and Fig. 4 is a section taken on line 4—4, Fig. 2.

In the drawing the machine has been illustrated as being formed in part by a rectangular frame having four angles 1 which form the four corners. The upper ends of the end posts on each side are connected by angle irons 2 while shorter pieces of angle irons 3 connect the sides opposite end posts. The lower ends of the opposite end posts are connected by means of angle irons while iron bars 5 extend parallel with the top angle irons 2. In this manner a rigid supporting frame is formed and this is preferably braced by diagonal brace members 6. Secured to the upper side of the two side members 2 are bearings 7 in which is journaled the shaft 8. Secured to this shaft, between the bearings 7 is a grinding wheel 9. This wheel has a hub 10 whose end comes in contact with the inner end of the adjacent bearing 7. (Fig. 2). A sprocket wheel 11 is secured to the shaft on the other side of the bearing and in this way the shaft is held against longitudinal movement. Secured to the outer end of shaft 8 is a belt wheel 12 to which the power for rotating the grinding wheel is applied. One side of the grinding wheel is provided with a number of radial ribs 13.
When the machine is in operation wheel 9 is rotated in a counter clockwise direction. (Fig. 1). Bolts 14 extend transversely from one side angle 2 to the one on the other side and these bolts serve to support the stationary semi-circular disk 15. This disk has lugs or ears 16 which are perforated for the reception of the bolts 14. Nuts 17 are provided on these bolts and these serve as stops for limiting the movement of the semi-circular disk towards the grinding wheel. Springs 18 surround the bolts 14 and extend from the outer surface of the disk to the inner surface of the adjacent side angle iron 2. (Fig. 2). These springs serve to normally hold the disk against the nuts 17 but permit it to move away from the grinding wheel when this becomes necessary. An eye bolt 19 is pivoted at 20 between two ears or lugs 21 that extend outwardly from the disk 15. This bolt extends through a hole in the bar 5 and its end is provided with a nut 22. A coil spring surrounds the bolt 19 and is under compression so that it tends to move the stationary disk 15 towards the grinding disk. The upper part of the grinding disk is enclosed in a housing comprising two side members 24 and 25. The side 24 is provided with a hopper 26 into which the material to be ground is fed. A conveyor 27, which has been illustrated as a screw conveyor but which may be a belt conveyor if desired, is supported with its lower end directly underneath the grinding wheel and has a hopper 28. A pair of trough-like members 29 enclose the lower portion of the grinding wheel and the stationary disk 15 and serve to direct the material into the hopper 28. The screw 29 is formed about the shaft 30 to the lower end of which the bevel gear 31 is secured. A shaft 32 is rotatably mounted in the bearings 33 and carries a bevel gear 34 that meshes with gear 31 and a sprocket wheel 35 that is connected by means of a chain 36 with sprocket wheel 11 on shaft 8. When the grinding wheel rotates the conveyor will also be operated and will carry away the material that passes through the machine.

Attention is directed to Fig. 4 which shows the grinding surface of the stationary disk and from which it will be seen that this surface is formed from two quadrants, each of which has a plurality of ribs. The quadrant located directly below the hopper 26 has parallel spaced ribs that extend vertically while the ribs on the other quadrant are radial. The reason for providing vertical ribs directly below the feed hopper is that by so doing the material will more readily enter between the rotary wheel and the stationary disk as the action of gravity will assist in feeding the material. After the material has entered the space between the relatively movable surfaces, it will be carried along by the rotating wheel and thoroughly ground between the radial ribs, on the wheel and disk. It will be seen from this that the parallel vertical ribs below the feed hopper facilitate the feeding of the material while the radial ribs are more effective for grinding.

The operation of the machine is as follows:

The grinding wheel 9 is rotated in a counter clockwise direction (Fig. 1) by some suitable source of power, as for example, an internal combustion engine. When wheel 9 rotates the conveyor screw 29 will also be rotated in such a direction that it will convey material upwardly. Soil, manure, leaf mould and fertilizer or any of these ingredients are deposited into the hopper 26 and will come into contact with the rotating ribs on the grinding wheel and will be carried downwardly between it and the stationary plate 15 and be thoroughly pulverized after which it drops into the hopper 28 where it is engaged by the rotating screw and finally deposited in a pile underneath the delivery end of the conveyor. If hard lumps of ground or rocks are accidentally fed to the machine, the plate 15 which is held in position by means of springs will yield and thereby prevent breakage. The plate 15 is supported on the bolts 14 on which it may slide and therefore it can be moved away from the rotating wheel so as to remain parallel with it or one end can move out farther than the other; this makes it possible for this plate to adjust itself to pass stones or other hard materials without danger of breakage.

Having thus described my invention, what I claim as new is:

1. A grinding and mixing machine for preparing soil, comprising, in combination, a supporting framework, a grinding wheel rotatably mounted on said framework, a stationary substantially semicircular disk non-rotatably secured to the framework in parallel relation with the grinding wheel, means comprising transverse bolts and springs for normally holding the stationary wheel in position adjacent the grinding disk but permitting it to move away from the latter, in parallel relation with respect thereto when soil or the like is fed between the two members or to tilt with respect to the grinding wheel whereby hard bodies may pass between the disk and wheel, and a hopper for directing material into the space between the grinding wheel and the stationary disk.

2. A machine for grinding soil comprising, in combination, a supporting frame, a grinding wheel supported thereby so as to rotate in a vertical plane, one side of said wheel being roughened, a substantially semi-circular plate having one surface roughened, means for supporting said plate with its roughened surface adjacent the roughened surface of the wheel, resilient means for urging said plate towards or away from the grinding wheel so that different portions thereof may move outward to different distances than other portions thereof whereby hard bodies may pass between the plate and wheel, means for limiting the movement of the plate towards the wheel and a hopper for directing material into the space between the wheel and the plate, said hopper being located to one side of the vertical diameter of the wheel.

3. A soil grinding and mixing machine comprising, in combination, a supporting framework, a circular grinding wheel having one side roughened, means for supporting said wheel from the framework so that it may rotate in a vertical plane, a complimentary grinding plate having one side roughened, said plate having two openings, supporting bolts passing through the openings and having their ends secured to the frame whereby the grinding plate is supported, springs surrounding said bolts, said springs being located between the frame and the plate a second bolt having one end connected to the plate and the other end slidably connected with the frame, a spring surrounding the last named bolt, and a hopper for directing material into the space between the wheel and the plate.

4. A grinding and mixing machine for soil comprising, in combination, a supporting frame, a disk-like grinding wheel rotatably supported on the frame, one side of said wheel having a plurality of spaced projections, two supporting bolts extending transversely of the plane of the grinding wheel substantially in a horizontal plane with the axis of the grinding wheel, a plate extending downwardly therefrom and slidably supported by said bolts, compression springs on said bolts between the plate and the frame, said springs urging the plate towards the grinding wheel, and yieldable means for urging the lower portion of the plate towards the wheel.

5. A soil pulverizer comprising a frame having spaced parallel sides, a bearing supported by each side of the frame a shaft rotatably journalled in the bearings, a grinding wheel secured to the shaft intermediate the bearings to be rotated thereby, said wheel having a plurality of projections on one side, a plate of less than three hundred sixty degrees in extent nonrotatably secured to the frame on the same side of the grinding wheel as the projections, said plate being transversely movable, resilient means for urging the stationary plate inwardly toward the grinding wheel but yieldable to permit different portions of the plate to move away from the grinding wheel to different distances than other portions thereof during the turning of the grinding wheel whereby hard bodies may pass between the plate and wheel without damaging the pulverizer.

6. A soil pulverizer and mixer comprising a frame having spaced parallel sides, a bearing supported on each side of the frame, a shaft extending transversely of the frame, a circular grinding wheel secured to the shaft intermediate the bearings to be rotated thereby, said wheel having one side provided with a plurality of projections, a substantially semi-circular plate nonrotatably secured to the frame, said plate being located on that side of the grinding wheel which has the projections, said plate being movable towards and away from the grinding wheel, resilient means for urging the plate inwardly towards the wheel but yieldable to permit different portions of the plate to move away from the grinding wheel to different distances than other portions thereof during the turning of the grinding wheel whereby hard bodies may pass between the plate and wheel without damaging the pulverizer.

7. In a machine for pulverizing soils, a supporting structure, a rotatable pulverizing member journaled on said supporting structure, a cooperating non-rotatable pulverizing member mounted on said supporting structure adapted for movement inward toward and outward away from said rotatable pulverizing member, and means for normally holding said non-rotatable pulverizing member in its inner position but yieldable to permit different portions of this member to move outward away from the rotatable pulverizing member to different distances as the rotatable pulverizing member is turned whereby the pulverizing members will not be damaged by solid masses passing therethrough unbroken by the members.

8. In a machine for pulverizing soils as set forth in claim 7, means for limiting the movement of said non-rotatable pulverizing member inward toward the rotatable pulverizing member whereby the engagement of said members may be prevented but the proper relation between the members may be obtained for disintegrating masses of soil passing between the members.

9. In a machine for pulverizing soils, a supporting structure, a rotatable disk pulverizing member journaled on said supporting structure, a non-rotatable pulverizing member mounted on said supporting structure and extending entirely across a portion of the path of the rotatable disk to cooperate with the surface of said rotatable disk pulverizing member from its axis outwardly in opposite directions to its periphery and leaving a portion of the path to one side thereof free, and a soil feeding hopper mounted on the supporting structure adjacent to the free portion of the path of the rotatable disk pulverizing member whereby soil may be fed directly against a side portion of the rotatable member and carried thereby between the cooperating pulverizing members for pulverizing and mixing soils placed into the soil feeding hopper.

10. In a machine for pulverizing soils in accordance with claim 11, in which the cooperating or pulverizing surfaces of the pulverizing members are arranged vertically with the non-rotatable member extending across the entire lower half of the path of the rotatable pulverizing member and the feeding hopper above the turning axis of the rotatable member, a pair of troughs carried by the supporting structure directed downwardly and toward each other under the pulverizing members for receiving soil passing from said pulverizing members and directing its course in its downward movement, and a receiving hopper at the adjacent ends of said troughs into which the soil is directed.

11. A grinding and mixing machine for preparing soil comprising in combination, a supporting frame, a round grinding wheel mounted for rotation on the frame, a substantially semi-circular disk located adjacent one side of the grinding wheel, means for supporting the disk from the frame so that different portions may move towards or away from the grinding wheel to different distances than other portions whereby hard bodies may pass between the disk and wheel, a plurality of yielding means applied to the disk at different points and each exerting a force tending to move it towards the surface of the wheel, stops for limiting the movement of the disk towards the wheel and a hopper located above the upper surface of the semi-circular disk and to one side of the center of the wheel for delivering material between the disks.

12. A grinding and mixing machine for preparing soil comprising in combination, a supporting frame, a substantial circular grinding wheel rotatably mounted on the frame, a plurality of bolts havings their ends supported by the frame and extending across the plane of the rotary wheel, a substantially semi-circular disk having an opening for each of said bolts and slidably supported on the bolts so as to be adapted for movement toward and away from the grinding wheel, each bolt having a stop for limiting the movement of the disk towards the wheel, and means comprising springs for exerting on the disk a yielding force tending to normally hold the disk against the stops while permitting it to yield to forces in opposition to the force exerted by the spring.

13. A grinding and mixing machine for preparing soil comprising in combination, a supporting frame, a grinding wheel rotatably supported thereon, one surface of the wheel having ribs, a stationary, substantially semi-circular disk supported on the frame adjacent the ribbed side of the wheel, a feed hopper located above the upper edge of the stationary disk and to one side of the center thereof, the surface of the stationary disk which is adjacent the wheel being defined by two quadrants, the quadrant below the feed hopper having vertical substantially parallel ribs and the other quadrant having radial ribs.

In testimony whereof I affix my signature.

OLAF E. ANDERSON.